(12) United States Patent
Larsson et al.

(10) Patent No.: US 10,084,349 B2
(45) Date of Patent: Sep. 25, 2018

(54) INDUCTIVE MODULE

(71) Applicant: Apple Inc., Cupertino, CA (US)

(72) Inventors: Karl Ruben F. Larsson, Los Altos, CA (US); Eric S. Jol, San Jose, CA (US); Christopher S. Graham, San Francisco, CA (US); Aaron A. Oro, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/701,237

(22) Filed: Sep. 11, 2017

(65) Prior Publication Data

US 2018/0233951 A1    Aug. 16, 2018

Related U.S. Application Data

(60) Provisional application No. 62/459,149, filed on Feb. 15, 2017, provisional application No. 62/542,206, filed on Aug. 7, 2017.

(51) Int. Cl.
| | |
|---|---|
| *H02J 7/00* | (2006.01) |
| *H02J 50/12* | (2016.01) |
| *H01F 27/24* | (2006.01) |
| *H01F 27/28* | (2006.01) |

(Continued)

(52) U.S. Cl.
CPC .............. *H02J 50/12* (2016.02); *H01F 27/24* (2013.01); *H01F 27/28* (2013.01); *H02J 7/025* (2013.01); *H04B 5/0037* (2013.01)

(58) Field of Classification Search
USPC ....................................................... 320/108
See application file for complete search history.

(56) References Cited

U.S. PATENT DOCUMENTS

| | | | |
|---|---|---|---|
| 6,127,799 A | 10/2000 | Krishnan | |
| 8,115,449 B2 | 2/2012 | Jung | |
| 8,618,696 B2 | 12/2013 | Kurs et al. | |

(Continued)

FOREIGN PATENT DOCUMENTS

| | | |
|---|---|---|
| EP | 2814046 | 12/2014 |
| EP | 2950416 | 12/2015 |

(Continued)

OTHER PUBLICATIONS

PCT/US2017/051147, "Invitation to Pay Add'l Fees and Partial Search Report", dated Dec. 5, 2017, 20 pages.

*Primary Examiner* — Robert Grant
(74) *Attorney, Agent, or Firm* — Kilpatrick Townsend & Stockton LLP (57) ABSTRACT

Embodiments describe a wireless power receiving module to receive magnetic flux for wireless power transfer. The wireless power receiving module includes a receiver coil comprising a single length of wire wound into a plurality of turns, an electromagnetic receiver shield coupled to a first side of the receiver coil, a ferrite layer coupled to a second side of the receiver coil opposite of the first side, the ferrite layer positioned to redirect magnetic flux during the charging event to improve charging efficiency, and a thermal mitigation shield comprising a thermally conductive layer adhered to an electrically conductive layer where the electrically conductive layer is coupled to ground, and where the ferrite layer is sandwiched between the thermal mitigation shield and the receiver coil.

20 Claims, 8 Drawing Sheets

(51) Int. Cl.
*H02J 7/02* (2016.01)
*H04B 5/00* (2006.01)

(56) References Cited

U.S. PATENT DOCUMENTS

| | | | |
|---|---|---|---|
| 9,106,083 B2* | 8/2015 | Partovi | H02J 7/025 |
| 2006/0102871 A1* | 5/2006 | Wang | A61L 27/446 |
| | | | 252/62.51 R |
| 2006/0145697 A1* | 7/2006 | Mikhaltsevitch | G01R 33/441 |
| | | | 324/318 |
| 2011/0050164 A1* | 3/2011 | Partovi | H01F 5/003 |
| | | | 320/108 |
| 2013/0126622 A1* | 5/2013 | Finn | G06K 19/07771 |
| | | | 235/492 |
| 2013/0181535 A1 | 7/2013 | Muratov et al. | |

FOREIGN PATENT DOCUMENTS

| | | |
|---|---|---|
| WO | 2011040392 | 4/2011 |
| WO | 2013061615 | 5/2013 |

\* cited by examiner

INDUCTIVE MODULE

CROSS-REFERENCES TO RELATED APPLICATIONS

This application is a non-provisional patent application of and claims the benefit to U.S. Provisional Patent Application No. 62/459,149, filed Feb. 15, 2017 and titled "Inductive Module," and U.S. Provisional Patent Application No. 62/542,206, filed Aug. 7, 2017 titled "Inductive Module," and is related to concurrently filed and commonly assigned U.S. patent application Ser. No. 15/701,224, entitled "ELECTROMAGNETIC SHIELDING FOR WIRELESS POWER TRANSFER SYSTEMS", the disclosures of which are herein incorporated by reference in their entirety for all purposes.

BACKGROUND

Portable electronic devices (e.g., mobile phones, media players, electronic watches, and the like) include a rechargeable battery that provides electrical power to operate the devices. In many such devices the battery can be recharged by coupling the electronic device to a power source through a physical connection, such as through a charging cord. Using a charging cord to charge a battery in an electronic device, however, requires the electronic device to be physically tethered to a power outlet. Additionally, using a charging cord requires the mobile device to have a connector, typically a receptacle connector, configured to mate with a connector, typically a plug connector, of the charging cord. The receptacle connector typically includes a cavity in the electronic device that provides an avenue within which dust and moisture can intrude and damage the device. Furthermore, a user of the electronic device has to physically connect the charging cable to the receptacle connector in order to charge the battery.

To avoid such shortcomings, wireless charging devices have been developed to wirelessly charge electronic devices without the need for a charging cord. For example, the battery in some electronic devices can be recharged by merely resting the device on a charging surface of a wireless charging device. A transmitter coil disposed below the charging surface may produce a time-varying magnetic flux that induces a current in a corresponding receiving coil in the electronic device. The induced current can be used by the electronic device to charge its internal battery.

Some existing wireless charging devices and electronic devices configured for wireless charging have a number of disadvantages. For instance, some wireless charging devices generate an unintended voltage on a receiving coil. The unintended voltage can create noise in the electronic device within which the receiving coil is housed. The noise can cause disturbance of sensitive electronic components in the electronic device, such as touch-sensitive components like a touch-sensitive display. As another example, while being charged, some electronic devices generate an unintended voltage on a transmitter coil in the wireless charging device. The unintended voltage can cause inefficiencies in the wireless power transfer. Additionally, the receiver coil and other components that are required for an electronic device to wirelessly receive power from a wireless charging device require a certain amount of real estate in the electronic device and can undesirably increase a thickness of the electronic device as compared to a similar device without a receiver coil and its associated components.

BRIEF SUMMARY

Some embodiments of the disclosure pertain to a wireless charging system with shielding components that avoid the generation of detrimental voltages on a receiver coil and/or a transmitter coil of the charging system during wireless power transfer. In some embodiments, a transmitter shield and a receiver shield are implemented in a wireless charging system to intercept electric fields generated between the transmitter coil and the receiver coil during wireless power transfer. By intercepting the electric fields, detrimental voltages are prevented from being generated on the receiver coil by the transmitter coil, and vice versa, during wireless power transfer.

In some embodiments, a wireless power receiving module to receive magnetic flux for wireless power transfer includes a receiver coil comprising a single length of wire wound into a plurality of turns, the receiver coil configured to receive magnetic flux generated by a transmitter coil in a wireless charging device during a charging event and generate a plurality of electric fields; an electromagnetic receiver shield coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil; a ferrite layer coupled to a second side of the receiver coil opposite of the first side, the ferrite layer positioned to redirect magnetic flux during the charging event to improve charging efficiency; and a thermal mitigation shield comprising a thermally conductive layer adhered to an electrically conductive layer where the electrically conductive layer is coupled to ground, enabling the electrically conductive layer to capture stray flux during the charging event, where the ferrite layer is sandwiched between the thermal mitigation shield and the receiver coil.

The electromagnetic receiver shield can be grounded to discharge voltage generated by the plurality of electric fields. In particular embodiments, the electromagnetic receiver shield includes silver. The receiver coil can include copper having plated layers of nickel and immersion gold formed over the copper. In some embodiments, the thermally conductive layer includes graphite and the electrically conductive layer includes copper. In some instances, the wireless power receiving module can further include a flex circuit formed of a flexible dielectric layer having first and second opposing sides, where the receiver coil is disposed on the first side and the electromagnetic receiver shield is disposed on the second side. The copper layer can be directly attached to the ferrite layer. The receiver coil can have a trace width-to-gap ratio of 70 to 30. Each turn of the plurality of turns can have a wire width that is different than other turns of the plurality of turns.

In some embodiments, an electronic device configured to receive magnetic flux for wireless power transfer includes a housing having a charging surface; a battery positioned within the housing; a wireless power receiving module positioned within the housing adjacent to the charging surface to receive magnetic flux for wireless power transfer during a charging event, the wireless power receiving module comprising: a receiver coil comprising a single length of wire wound into a plurality of turns, the receiver coil configured to receive magnetic flux generated by a transmitter coil in a wireless charging device during a charging event and generate a plurality of electric fields; an electromagnetic receiver shield coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil; a ferrite layer coupled to a second side of the receiver coil opposite of the first side, the ferrite layer positioned to redirect magnetic flux during the charging event to improve charging efficiency; and a thermal mitigation shield comprising a thermally conductive layer adhered to an electrically conductive layer where the electrically conductive layer is coupled to ground, enabling the electrically conductive layer to capture stray flux during the charging event, where the ferrite layer is sandwiched between the thermal mitigation shield and the receiver coil.

The electromagnetic receiver shield can be grounded to discharge voltage generated by the plurality of electric fields. The electromagnetic receiver shield can include silver. The receiver coil can include copper having plated layers of nickel and immersion gold formed over the copper. The thermally conductive layer can include graphite and the electrically conductive layer can include copper.

In some embodiments, a wireless charging system includes a wireless charging device including a transmitter coil configured to generate a magnetic flux across a charging surface and a transmitter shield positioned between the charging surface and the transmitter coil, the transmitter shield made from material that enables the transmitter shield to intercept some electric fields generated during a charging event and directed away from the transmitter coil and allow the magnetic flux to pass through the transmitter shield; an electronic device configured to receive the magnetic flux generated by the wireless charging device during a charging event, the electronic device comprising: a housing having a charging surface; a battery positioned within the housing; and a wireless power receiving module positioned within the housing adjacent to the charging surface to receive magnetic flux for wireless power transfer during a charging event, the wireless power receiving module comprising: a receiver coil comprising a single length of wire wound into a plurality of turns, the receiver coil configured to receive magnetic flux generated by a transmitter coil in a wireless charging device during a charging event and generate a plurality of electric fields; an electromagnetic receiver shield coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil; a ferrite layer coupled to a second side of the receiver coil opposite of the first side, the ferrite layer positioned to redirect magnetic flux during the charging event to improve charging efficiency; and a thermal mitigation shield comprising a thermally conductive layer adhered to an electrically conductive layer where the electrically conductive layer is coupled to ground, enabling the electrically conductive layer to capture stray flux during the charging event, where the ferrite layer is sandwiched between the thermal mitigation shield and the receiver coil.

The electromagnetic receiver shield can be grounded to discharge voltage generated by the plurality of electric fields. The electromagnetic receiver shield can include silver. The receiver coil can include copper having plated layers of nickel and immersion gold formed over the copper. The thermally conductive layer can include graphite and the electrically conductive layer can include copper. The wireless charging system can further include a flex circuit formed of a flexible dielectric layer having first and second opposing sides, where the receiver coil is disposed on the first side and the electromagnetic receiver shield is disposed on the second side.

A better understanding of the nature and advantages of embodiments of the present invention may be gained with reference to the following detailed description and the accompanying drawings.

DETAILED DESCRIPTION

Figure 1:
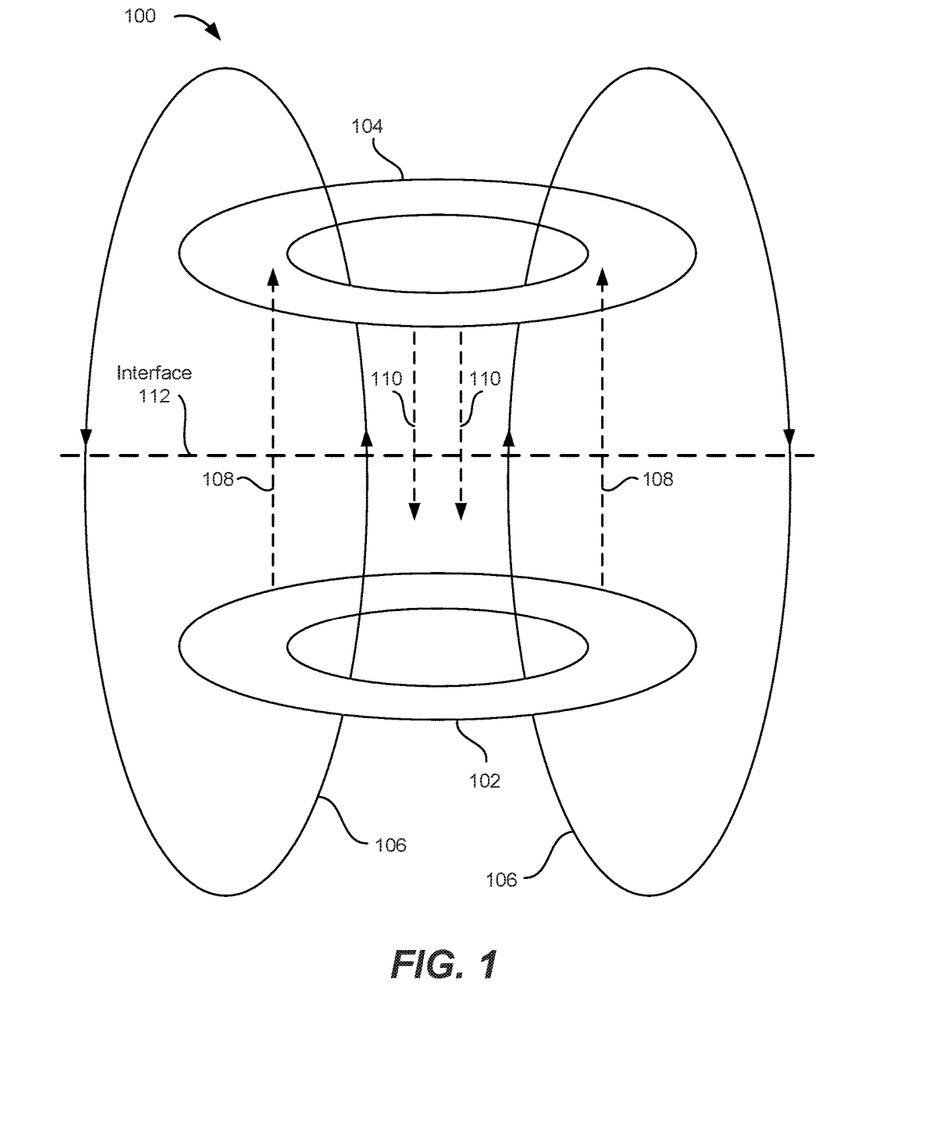
FIG. 1 is a simplified diagram illustrating electrical interactions between a transmitter coil and a receiver coil of a wireless charging system during wireless power transfer.

During wireless power transfer in a wireless charging system, numerous electrical interactions can occur between a transmitter coil and a receiver coil in the wireless charging system. Some of the electrical interactions are intended interactions between the transmitter and receiver coil, while other electrical interactions are unintended interactions that can cause inefficiencies in power transfer and create issues in the electronic device. For example, FIG. 1 is a simplified diagram illustrating electrical interactions between a transmitter coil 102 and a receiver coil 104 of an exemplary wireless charging system 100 during wireless power transfer. Transmitter coil 102 may be disposed within a wireless charging device, such as a wireless charging mat, and receiver coil 104 may be disposed within a consumer electronic device, such as a smart phone, smart watch, tablet, laptop, and the like. The electronic device may rest on the wireless charging device at interface 112 to enable power transfer.

Transmitter coil 102 and receiver coil 104 can be positioned substantially concentric to one another to enable efficient power transfer by means of magnetic induction. During wireless power transfer, transmitter coil 102 can generate time-varying magnetic flux 106, which can propagate through both device housings at interface 112 and be received by receiver coil 104. Time-varying magnetic flux 106 interacts with receiver coil 104 to generate a corresponding current in receiver coil 104. The generated current can be used to charge a battery for operating the electronic device.

In addition to time-varying magnetic flux 106, however, electric fields 108 and 110 can be unintentionally generated between transmitter and receiver coils 102 and 104 during wireless power transfer. For instance, when transmitter coil 102 generates magnetic flux 106, a large voltage difference can exist between transmitter coil 102 and receive coil 104. The voltage on transmitter coil 102 in some cases can be larger than the voltage on receiver coil 104, thereby orienting some electric fields 108 toward receiver coil 104 and causing unintended voltage to be generated in receiver coil 104. In some additional cases, voltage existing on receiver coil 104 may also orient some electric fields 110 toward transmitter coil 102 and cause detrimental voltage to be generated on transmitter coil 102. Detrimental voltages generated on receiver coil 104 may disturb and/or disrupt the operation of sensitive components disposed proximate to receiver coil 104, such as touch-sensitive devices like a touch-sensitive display. And, detrimental voltages generated on transmitter coil 102 may cause inefficiencies in power transfer.

Embodiments of the disclosure describe a wireless charging system that mitigates the unintentional generation of detrimental voltage on a receiver and/or a transmitter coil during wireless power transfer. One or more electromagnetic shielding components may be incorporated in the wireless charging system to prevent electric fields from generating detrimental voltages on the receiver and/or transmitter coils, while allowing time-varying magnetic flux to freely propagate between the transmitter and receiver coils to perform wireless power transfer.

In some embodiments, a transmitter shield can be implemented in a wireless charging device to prevent detrimental voltage from being generated on a receiver coil in an electronic device. The transmitter shield can be positioned in the wireless charging device to intercept electric fields generated by the transmitter coil to prevent the electric fields from exposing on the receiver coil. As a result, the intercepted electric fields may generate voltage on the transmitter shield instead of on the receiver coil. This voltage can then be discharged by routing the voltage to ground, thereby disposing of the detrimental voltage and preventing it from affecting sensitive electronic components in the electronic device. A description of a transmitter shield according to some embodiments of the disclosure is set forth in U.S. Provisional Patent Application 62/399,082 entitled "ELECTROMAGNETIC SHIELDING FOR WIRELESS POWER TRANSFER SYSTEMS" filed on Sep. 23, 2016. The '082 provisional application is assigned to Apple Inc., the assignee of the present application, and is incorporated by reference herein in its entirety for all purposes.

In some embodiments, a receiver shield can be implemented within a wireless power receiving module of the wireless charging system to prevent detrimental voltage from being generated on the transmitter coil in the wireless charging device. The receiver shield can be positioned in the electronic device to intercept electric fields generated by the receiver coil so that the electric fields are not exposed to the transmitter coil. Voltage generated in the receiver shield can be discharged to ground to prevent detrimental voltage from being generated on the transmitter coil. Aspects and features of embodiments of such a wireless power receiving module are discussed in further detail herein.

Figure 2:
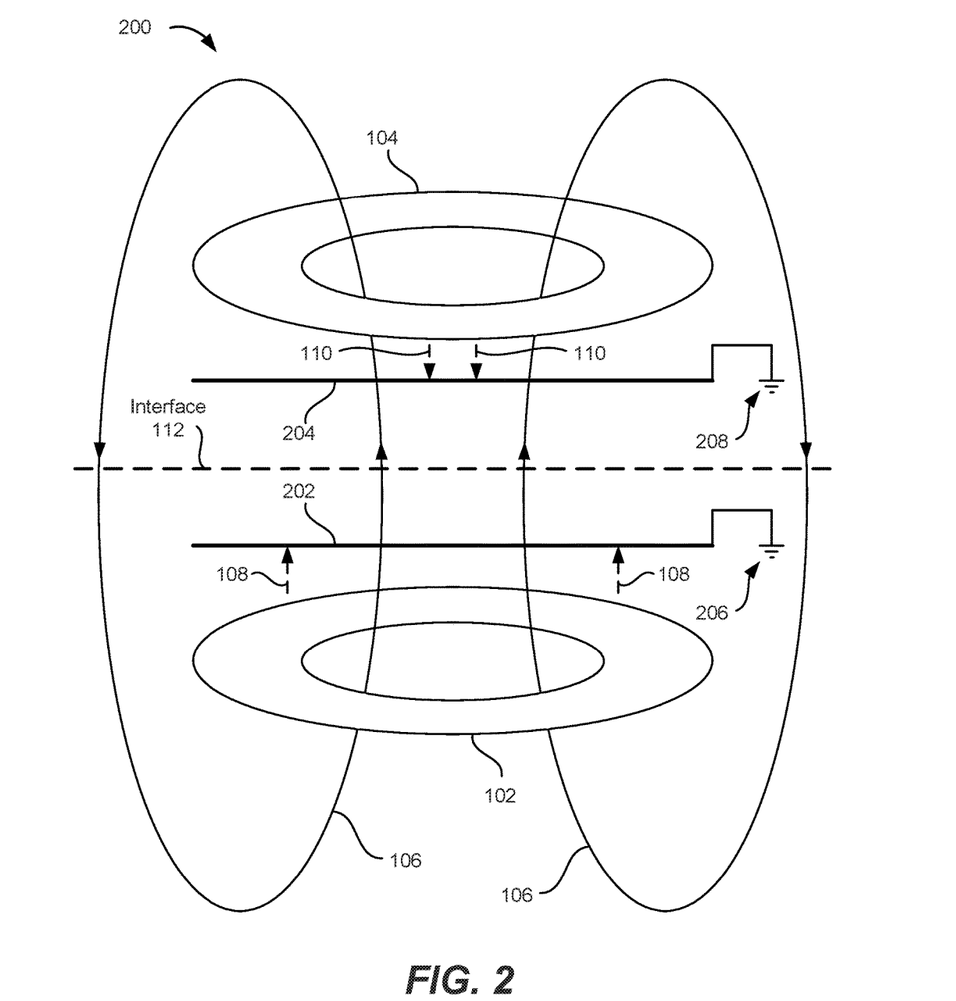
FIG. 2 is a simplified diagram illustrating an exemplary wireless charging system including a transmitter shield and a receiver shield according to some embodiments of the present disclosure.

FIG. 2 is a simplified diagram illustrating an exemplary wireless charging system 200 including a transmitter shield 202 and a receiver shield 204, according to some embodiments of the present disclosure. Transmitter shield 202 may be positioned in front of transmitter coil 102 so that magnetic flux 106 is directed toward transmitter shield 202. For instance, transmitter shield 202 is positioned between transmitter coil 102 and receiver coil 104 during wireless power transfer so that magnetic flux 106 first passes through transmitter shield 202 before reaching receiver coil 104. In some embodiments, transmitter shield 202 can be positioned between interface 112 and transmitter coil 102 when an electronic device rests on the wireless charging device to perform wireless power transfer. Accordingly, transmitter shield 202 and transmitter coil 102 can both be positioned within the wireless charging device. Transmitter shield 202 can be substantially transparent to magnetic flux 106 so that a substantial percentage of magnetic flux 106 generated by transmitter coil 102 is received by receiver 104.

While transmitter shield 202 can be substantially transparent to magnetic flux 106, transmitter shield 202 can, on the other hand, be substantially opaque to electric field 108 such that electric field 108 is substantially blocked by transmitter shield 202. This prevents electric field 108 from exposing on receiver coil 104 and generating an detrimental voltage on receiver coil 104. Because transmitter shield 202 substantially blocks electric field 108 before it can reach receiver coil 104, electric field 108 may generate voltage on transmitter shield 202 instead of receiver coil 104. The amount of voltage generated on transmitter shield 202 may correspond to the amount of voltage that would have been generated on transmitter coil 104 had transmitter shield 202 not been present.

In some embodiments, voltage generated on transmitter shield 202 can be removed so that the voltage does not permanently remain on transmitter shield 202. As an example, voltage on transmitter shield 202 can be discharged to ground. Thus, transmitter shield 202 can be coupled to a ground connection 206 to allow voltage on transmitter shield 202 to be discharged to ground. Ground connection 206 can be a ground ring or any other suitable conductive structure coupled to ground that can remove voltage from transmitter shield 202.

Similar to transmitter shield 202, a receiver shield 204 may also be implemented in wireless charging system 200 to prevent detrimental voltage from being generated on transmitter coil 102 from electric field 110 generated by receiver coil 104. Receiver shield 204 may be positioned in front of receiver coil 104 so that magnetic flux 106 first passes through receiver shield 204 before reaching receiver coil 104. In some embodiments, receiver shield 204 and receiver coil 104 are positioned within a wireless power receiving module which in turn is positioned within a housing of an electronic device as described below with respect to FIG. 3A. Within the module, receiver shield 204 can be positioned between interface 112 and receiver coil 104 when the electronic device rests on a wireless charging device to perform wireless power transfer.

Similar to transmitter shield 202, receiver shield 204 can be substantially transparent to magnetic flux 106 so that a substantial percentage of magnetic flux 106 generated by transmitter coil 102 passes through receiver shield 204 and is received by receiver 104, while receiver shield 204 can be substantially opaque to electric field 110 such that electric field 110 is substantially blocked by receiver shield 204. This prevents electric field 110 from reaching transmitter coil 102 and generating an detrimental voltage on transmitter coil 102 while enabling wireless power transfer. Like transmitter shield 202, receiver shield 204 may also be grounded so that voltage generated by electric field 110 may be discharged to a ground connection 208. Ground connection 208 may be a structure similar to ground connection 206 in some embodiments, or it may be the same structure as ground connection 206 in other embodiments.

By incorporating transmitter and receiver shield 202 and 204 into wireless charging system 200, the wireless charging device and the electronic device within which transmitter and receiver shields 202 and 204 are implemented, respectively, are exposing their grounds to each other. This mutes any ground noise caused by the electrical interactions between transmitter and receiver coils 102 and 104. As can be appreciated by disclosures herein, transmitter shield 202 and receiver shield 204 are shielding structures that are able to block the passage of electric fields, yet allow the passage of magnetic flux.

Figure 3A:
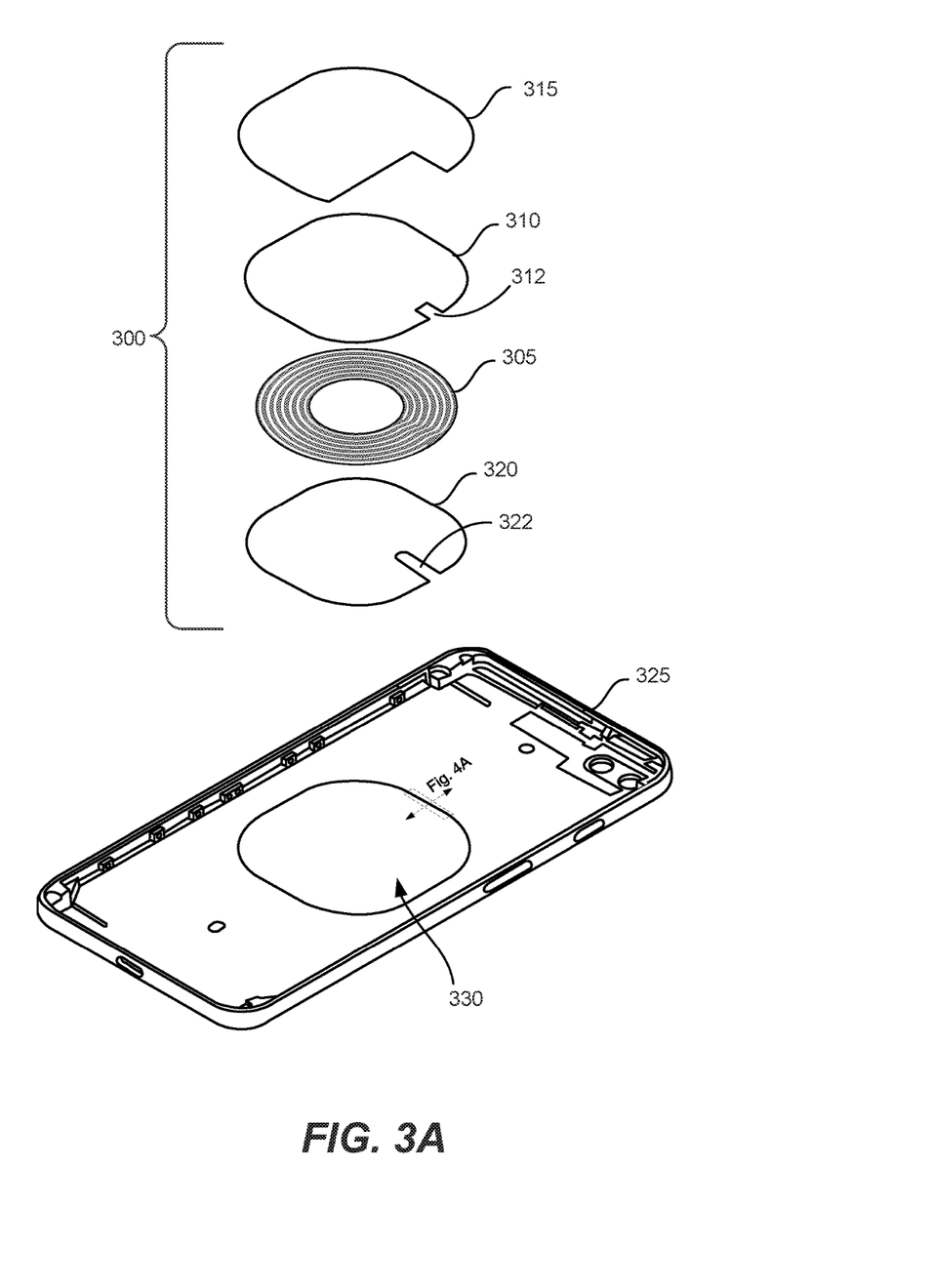
FIG. 3A illustrates an exploded view of an exemplary wireless power receiving module according to some embodiments of the disclosure that can be incorporated into an electronic device to wirelessly receive power from a wireless charger.

In some embodiments, a transmitter shield can be included in a wireless charging device, such as a wireless charging mat, and a receiver shield can be included within a wireless power receiving module included within a portable electronic device configured to rest on the wireless charging device to wirelessly receiver power from the wireless charging mat. FIG. 3A illustrates an exploded view of a wireless power receiving module 300 according to some embodiments of the disclosure that can be incorporated within a housing 325 of a portable electronic device. As shown in FIG. 3A, wireless power receiving module 300 can include at least three separate shields including an integrated coil and electromagnetic shield 305, a ferrite shield 310, and a thermal shield 315 along with an adhesive component 320 that attaches module 300 to housing 325.

Adhesive component 320 can be a single sheet of an adhesive material, such as pressure sensitive adhesive (PSA), that attaches wireless power receiving module 300 to housing 325. In other embodiments, instead of being attached to housing 325 with a single sheet of adhesive material, wireless power receiving module 300 can be attached to housing 325 with an attachment assembly that is composed of more than one sheet of adhesive material, as discussed herein with respect to FIG. 3B.

Figure 3B:
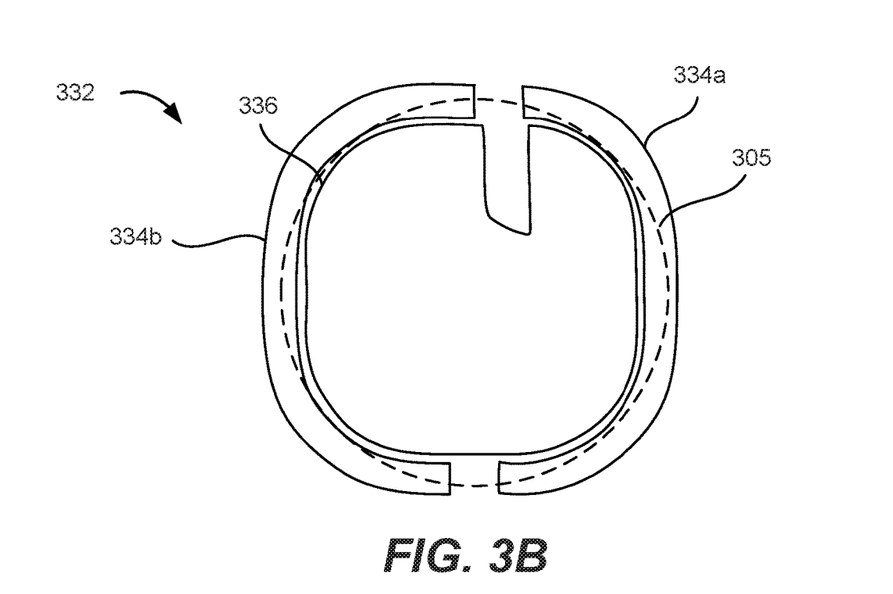
FIG. 3B illustrates an exemplary attachment assembly composed of a sheet of single-sided adhesive and double-sided adhesives positioned at edges of an integrated coil and electromagnetic shield in an overlapping arrangement, according to some embodiments of the present disclosure.

FIG. 3B illustrates an exemplary attachment assembly 332 composed of a sheet of single-sided adhesive 336 and double-sided adhesives 334a and 334b positioned at edges of integrated coil and electromagnetic shield 305 in an overlapping arrangement, according to some embodiments of the present disclosure. Double-sided adhesives 334a and 334b can be formed of PSA to attach thermal shield 315 to housing 325. Single-sided adhesive 336 can be attached to housing 325 and act as an anti-splinter film in case of a breakage event. In particular embodiments, single-sided adhesive 336 may not be coupled to wireless power receiving module 300 so that ferrite shield 310 and integrated coil and electromagnetic shield 305 are decoupled from housing 325. By decoupling ferrite shield 310 and integrated coil and electromagnetic shield 305 from housing 325, vibrations caused by time-varying magnetic fields generated during wireless power transfer may not be transferred to housing 325, thereby minimizing acoustic coupling between ferrite shield 310 and integrated coil and electromagnetic shield 305 from housing 325. In some embodiments, single-sided adhesive 336 is formed of polyimide. As shown in FIG. 3B, double-sided adhesives 334a and 334b can be positioned around the perimeter of integrated coil and electromagnetic shield 305. In some instances, double-sided adhesives 334a and 334b can overlap edges of integrated coil and electromagnetic shield 305, as indicated by the dotted profile of integrated coil and electromagnetic shield 305.

Figure 3C:
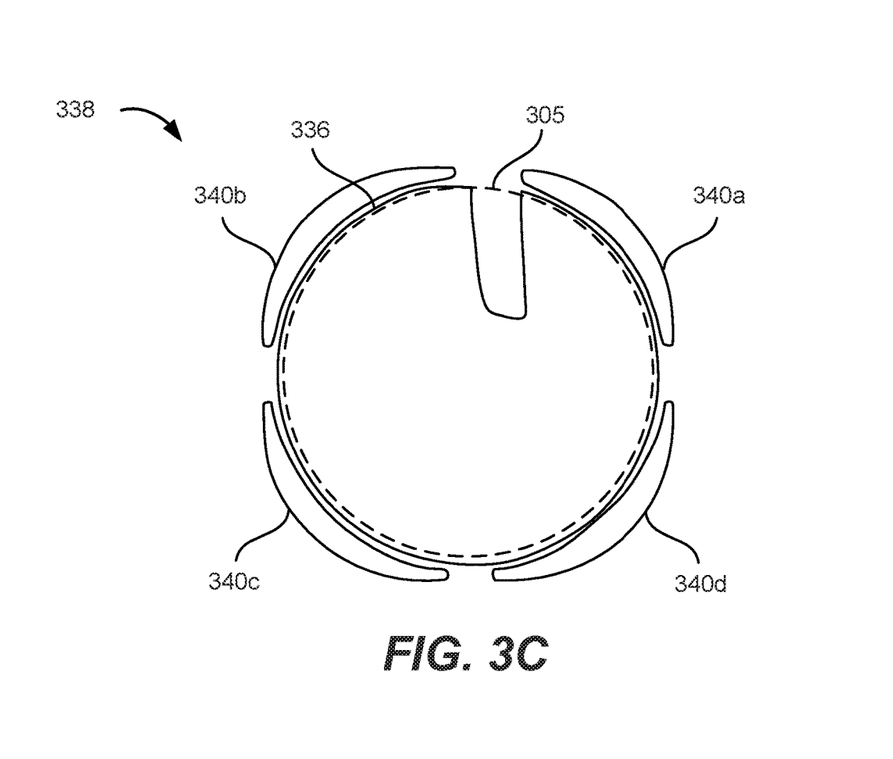
FIG. 3C illustrates an exemplary attachment assembly where double-sided adhesives are crescent-shaped and do not overlap with edges of an integrated coil and electromagnetic shield 305, according to some embodiments of the present disclosure.

Although FIG. 3B illustrates attachment assembly 340 as having double-sided adhesives 334a and 334b positioned around the perimeter of integrated coil and electromagnetic shield 305 in such a way that overlaps with edges of integrated coil and electromagnetic shield 305, embodiments are not so limited. Other attachment assemblies do not have to have double-sided adhesives that overlap with edges of integrated coil and electromagnetic shield 305. FIG. 3C illustrates an exemplary attachment assembly 338 where double-sided adhesives 340a-d are crescent-shaped and do not overlap with edges of integrated coil and electromagnetic shield 305, according to some embodiments of the present disclosure. Double-sided adhesives 340a-d are shaped as a crescent to conform to the outer profile of integrated coil and electromagnetic shield 305. As will be discussed further herein, double-sided adhesives 340a-d attach ferrite shield 310 to housing 325 without overlapping with integrated coil and electromagnetic shield 305. In some embodiments, single-sided adhesive 336 can have a shape that corresponds with the shape of integrated coil and electromagnetic shield 305. For instance, single-sided adhesive 336 can be substantially circular.

With reference back to FIG. 3A, integrated coil and electromagnetic shield 305 can act as, for example, receiver coil 104 and receiver shield 204 shown in FIG. 2 enabling wireless power receiving module 300 to wirelessly receive power transmitted from a wireless power transmitting coil, such as coil 102 shown in FIG. 2. When positioned within a portable electronic device, the receiver shield portion of the integrated coil and shield is positioned between the receiver coil portion and the charging surface of the electronic device. Thus, the receiver shield is positioned between the receiver coil and the transmitter coil and serves to prevent capacitive coupling to the transmit coil in the wireless charging device. Ferrite shield 310 acts as a B-field or magnetic field shield redirecting magnetic flux to get higher coupling to the transmit coil resulting in improved charging efficiency and helping prevent magnetic flux interference. Thermal shield 315 can include a graphite or similar layer that provides thermal isolation between wireless power receiving module 300 and the battery and other components of the electronic device in which the wireless power receiving module 300 is incorporated. Thermal shield 315 can also include a copper layer that is tied to ground and contributes to the thermal shielding while also capturing stray flux. Further details of the three different shields within module 300 are discussed below in conjunction with FIGS. 4A and 4B.

Still referring to FIG. 3A, in some embodiments a wireless power receiving module according to embodiments of the disclosure can be an integrated module made as thin as possible as described in more detail below in order to not unduly increase the thickness of the electronic device within which the module is positioned. Additionally, housing 325 can include a cutout area 330 sized and shaped to receive the wireless power receiving module thereby saving additional space within the electronic device within which the module is incorporated and allowing the electronic device to be made even thinner.

Figure 4A:
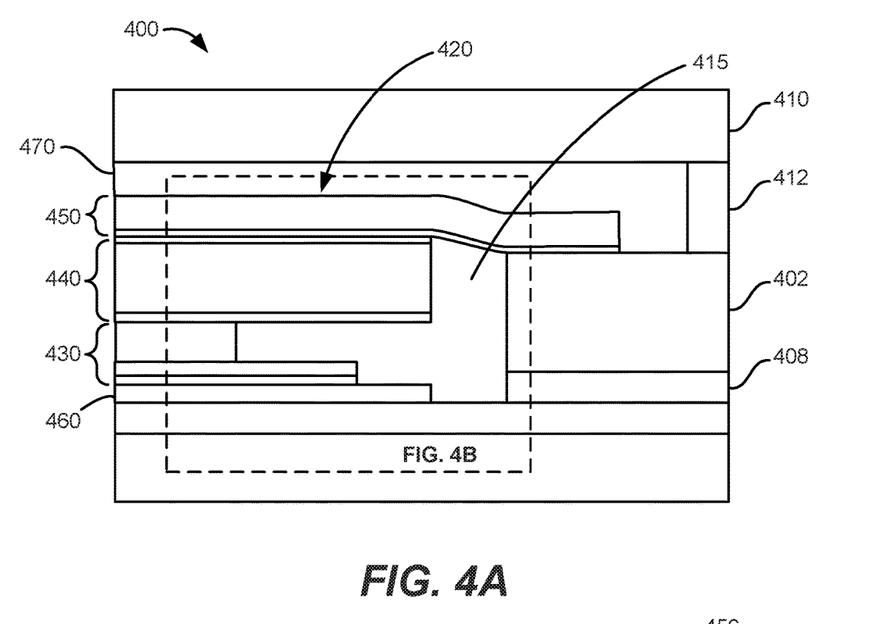
FIG. 4A is a simplified cross-sectional view of a portion of the wireless power receiving module shown in FIG. 3A according to some embodiments of the disclosure.
Figure 4B:
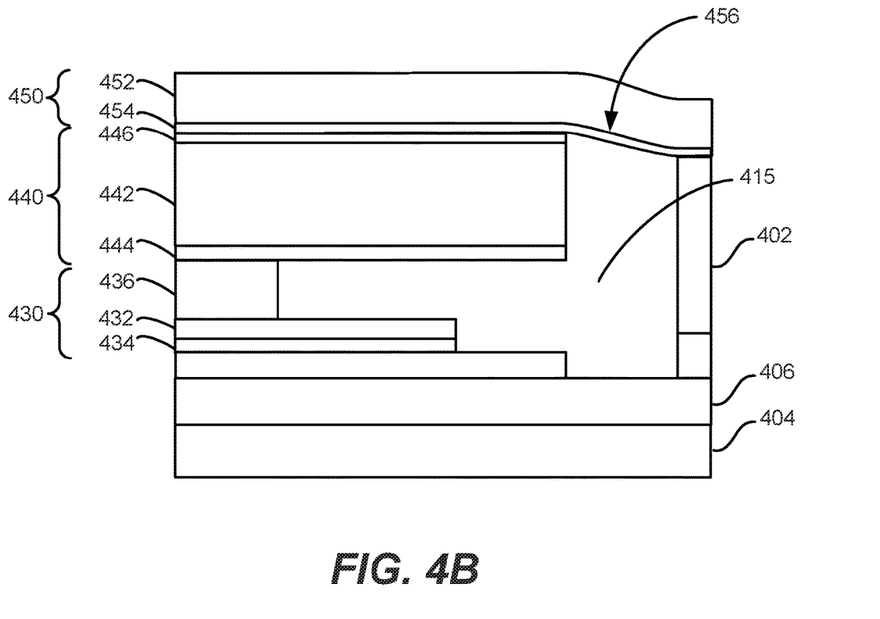
FIG. 4B is a simplified cross-sectional view of a portion of the wireless power receiving module shown in FIG. 4A.

Reference is now made to FIG. 4A, which is a simplified cross-sectional view of a portion of a wireless power receiving module 420 positioned within a housing of an electronic device 400. Wireless power receiving module 420 can be, for example, wireless receiving module 300 shown in FIG. 3A, while electronic device 400 can be any suitable portable electronic device, such as a smart phone, tablet computer, laptop computer, smart watch, or other type of consumer electronic device. As shown in FIG. 4B, electronic device 400 can include a housing 402 that defines the shape and size of the portable electronic device. Housing 402 can be, for example, housing 325 shown in FIG. 3A and can be formed from or include a relatively stiff and strong material such as a clad support plate. In some embodiments a glass plate 404 having a layer of ink 406 coated on the inside surface of the glass plate can be attached to housing 402 by an adhesive layer 408 to form a back surface of electronic device 400. In some embodiments ink layer 406 has low electrical conductivity and the color of the ink layer can be chosen to match other exterior surfaces of electronic device 400. Housing 402 can include a cutout region 415 that accepts wireless power receiving module 420 as described above with respect to cutout 330 allowing module 420 to occupy a minimum amount of space in the z direction within the electronic device 400.

With reference back to FIG. 4A, a battery 410 can be positioned within housing 402 along with other components (not shown) of the electronic device including but not limited to one or more processors, memory units, communications circuitry, sensors and the like that enable the electronic device to perform its intended functions. Battery 410 can be attached to housing 402 by, for example, a battery adhesive 412.

Wireless power receiving module 420 can be positioned within cutout region 415 to minimize the space in the z direction the module requires within portable electronic device 400. As shown, wireless power receiving module can include three separate shields including an integrated coil and electromagnetic shield 430, a ferrite shield 440 and a thermal shield 450. Integrated coil and electromagnetic shield 430 can be representative of integrated coil and electromagnetic shield 315 shown in FIG. 3A; ferrite shield 440 can be representative of ferrite shield 310 and thermal shield 450 can be representative of thermal shield 305. An adhesive 460, such as a pressure sensitive adhesive, can attach module 420 to ink-coated glass layer 404/406 and act as an anti-splinter film in case of a breakage event.

In some embodiments of the disclosure, a small gap 470 can be formed between an upper surface of the wireless power receiving module and a lower surface of battery 410. The gap provides a level of tolerance during manufacturing to ensure that wireless power receiving 420 and battery 410 are not in physical contact with each other and thus ensure that the wireless power receiving module does not interfere with attachment of the battery to housing 402.

As shown in FIG. 4B, integrated coil and electromagnetic shield 430 can include a flexible dielectric base layer 432, such as a polymide layer, with an electromagnetic receiver shield 434 formed directly on one side of polymide layer 432 and a copper receiver coil 436 can be formed directly on the opposing side. Having receiver shield 434 and receiver coil 436 formed directly on opposing sides of base layer 432 allows a single carrier layer to be used for both the receiver shield and receiver coil and thus enables the overall thickness of wireless power receiving module 420 to be reduced. To further reduce thickness, some embodiments of the disclosure do not include a coverlay or other type of protective layer over the flex as is used for traditional flex circuits to encapsulate and protect the circuits formed on the flex. Instead, some embodiments of the disclosure plate the receiver coil 436 with an electroless nickel plating process followed by and a thin layer of immersion gold that protects the nickel from oxidation.

Receiver shield 434 can be formed from a material having properties that enable magnetic flux to pass through but prevent electric fields from passing through. In some embodiments, receiver shield 434 is formed from of silver. During a wireless power charging event, receiver shield 434 is positioned between copper receiver coil 436 and the wireless power charger to intercept electrical fields associated with receiver shield 434 during wireless power transfer to prevent detrimental voltage from being generated on the transmitter coil, while copper receiver coil can be made relatively thick (e.g., 70 microns in some embodiments) to provide strong inductive performance during the charging event.

Ferrite shield 440 includes a relatively thick layer of ferrite material 442 sandwiched between a thin adhesive layer 444 and a thin thermoplastic polymer layer 446, such as a PolyEthylene Terephthalate film. Adhesive layer 444 and thermoplastic polymer layer 446 provide a carrier for ferrite layer 442 that contains the ferrite and prevents minor cracks, burrs or other imperfections at the ferrite surface from coming into contact with other components of the wireless power receiving module. Ferrite shield 440 is positioned within wireless power receiving module 420 on the opposite side of copper receiving coil 436 as electromagnetic shield 434.

Thermal shield 450 can include a thermal layer 452 adhered to a conductive layer 454 by a thin conductive adhesive (not shown). Thermal layer 452 provides thermal isolation between wireless power receiving module 300 and various components of electronic device 400 including battery 410. Conductive layer 454 provides additional thermal shielding and can be coupled to ground to capture stray flux and prevent such flux from interfering with the display (not shown) or other components of device 400. While not shown in FIG. 4B, a first thin layer of conductive adhesive (e.g., 5 microns) can adhere thermal layer 452 to conductive layer 454, a second thin layer of conductive adhesive (e.g., 5 microns) can adhere conductive layer 454, and thus thermal shield 450, to ferrite shield 440, and a thin thermoplastic polymer layer, such as a 5 micron PolyEthylene Terephthalate film, can be used to cover the top exterior surface of graphite layer 452. In some embodiments, thermal layer 452 can be formed of any suitable material that has high thermal conductivity, such as but not limited to, graphite. And, conductive layer 454 can be formed of any suitable material that has high electrical conductivity, such as but not limited to, aluminum, stainless steel, nickel, and metal alloys including at least one of the aforementioned electrically conductive materials.

Figure 5:
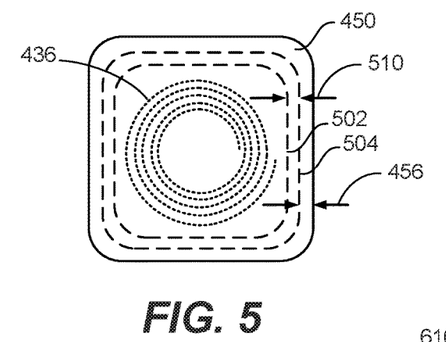
FIG. 5 is a simplified top view of the wireless power receiving module shown in FIGS. 4A and 4B.

As shown in each of FIGS. 4A, 4B and 5, thermal shield 450 can include a section 456 that extends beyond the edges of cutout 415 over housing 402 to provide continuous metal coverage behind wireless power receiving module 420 to prevent flux leakage from occurring in the gap formed between the outer edges of module 420 and the inner edges of housing 402 in cutout region 415. Referring to FIG. 5, when wireless power receiving module 420 is positioned within cutout 415, a gap 510 can extend around the entire outer periphery 502 of portions 430, 440 and 460 of wireless power receiving module 420 between the wireless power receiving module and an inner periphery 504 of the cutout portion of housing 402. Section 456 can extend over gap 510 and over the inner edge of the cutout of housing 402 completely covering the gap on all sides of copper coil 436 integrated coil and electromagnetic shield 430.

Figure 4C:
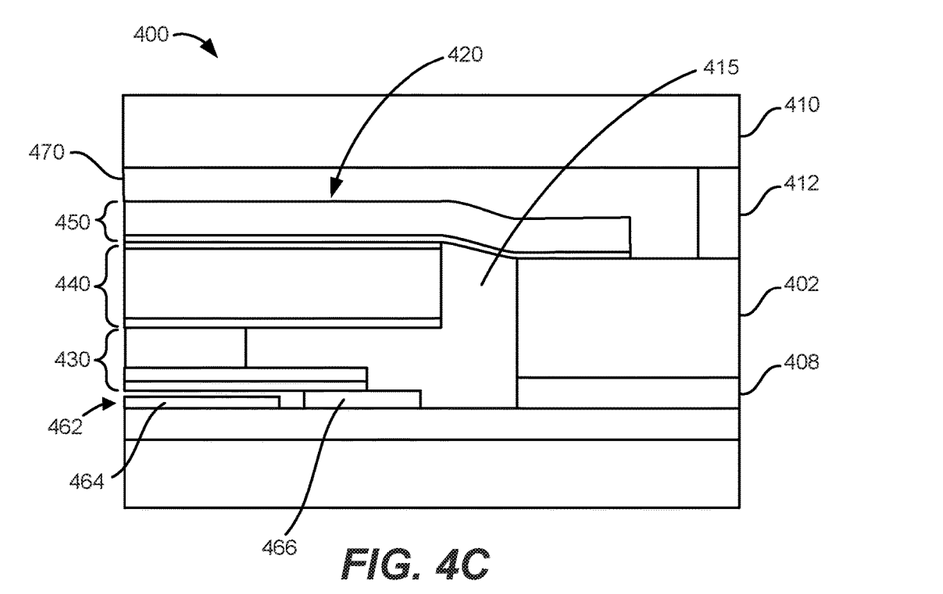
FIG. 4C is a simplified cross-sectional view of a portion of the wireless power receiving module shown in FIG. 4A with an adhesive assembly shown in FIG. 3B, according to some embodiments of the present disclosure.

FIGS. 4A and 4B illustrate cross-sections of device 400 where adhesive 460 is a single sheet of adhesive material. FIG. 4C, however, illustrates a cross-sectional view of device 400 where adhesive 460 is an attachment assembly 462 (such as attachment assembly 332 discussed herein with respect to FIG. 3B) composed of a sheet of single-sided adhesive 464 and double-sided adhesive 466 positioned at an edge of integrated coil and electromagnetic shield 460 in an overlapping arrangement. In some embodiments, single-sided adhesive 464 can be attached to ink layer 406 and not integrated coil and electromagnetic shield 430. Double-sided adhesive 466 can be coupled between integrated coil and electromagnetic shield 430 and ink layer 406.

Figure 4D:
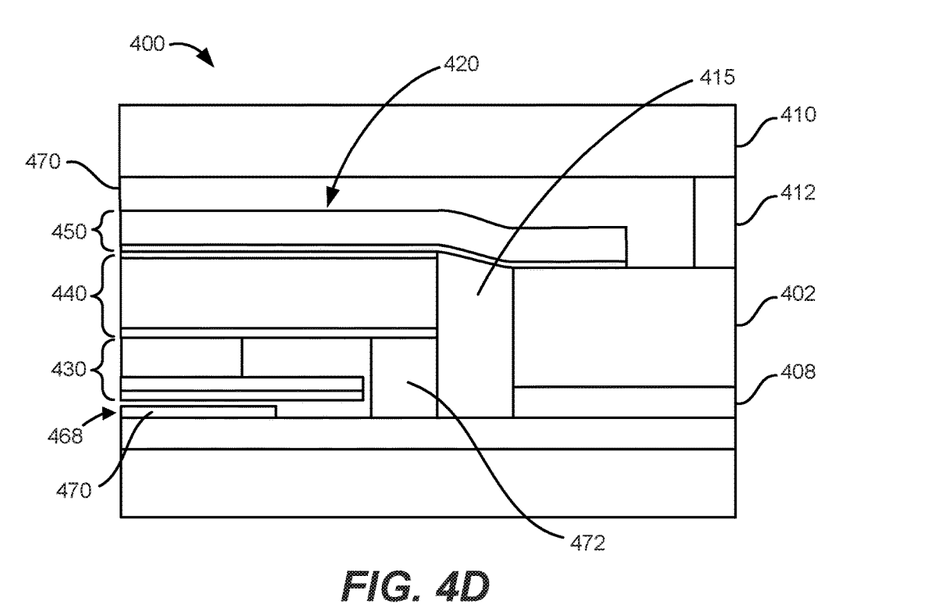
FIG. 4D is a simplified cross-sectional view of a portion of the wireless power receiving module shown in FIG. 4A with an adhesive assembly shown in FIG. 3C, according to some embodiments of the present disclosure.

FIG. 4D illustrates a cross-sectional view of device 400 where adhesive 460 is an attachment assembly 468 (such as attachment assembly 338 discussed herein with respect to FIG. 3C) composed of a sheet of single-sided adhesive 470 and double-sided adhesive 472 positioned at an edge of integrated coil and electromagnetic shield 460 in a non-overlapping arrangement. In some embodiments, single-sided adhesive 470 can be attached to ink layer 406 and not integrated coil and electromagnetic shield 430. Double-sided adhesive 466 can be coupled between ferrite shield 440 and ink layer 406. These different adhesive configurations can widen manufacturing tolerances of the overall height of the stack of components, as well as decrease the amount of surface area covered by the adhesive material.

As stated above, in various embodiments wireless power receiving module 400 is manufactured to be very thin. As an example, in some embodiments wireless power receiving module 400 fits within the height of housing 402 and battery adhesive 412. In one particular embodiment, wireless power receiving module 400 is no more than 250 microns thick with thermal shield 450 being approximately 70 microns thick, ferrite shield 440 being approximately 110 microns and integrated coil and electromagnetic shield 430 being approximately 70 microns thick.

Figure 6A:
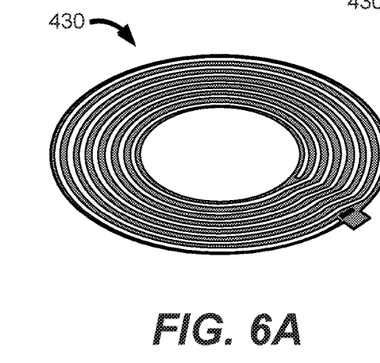
FIGS. 6A-6C illustrate simplified perspective, top and bottom plan views of a wireless power receiving module according to some embodiments of the disclosure.
Figure 6B:
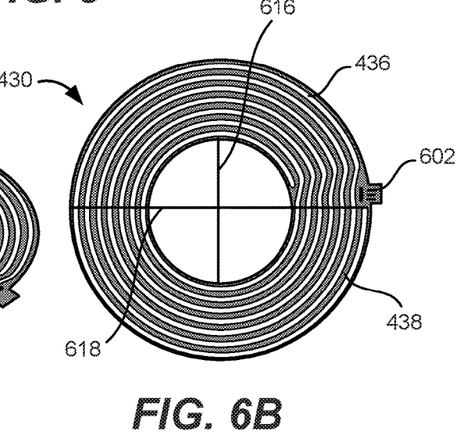
Figure 6C:
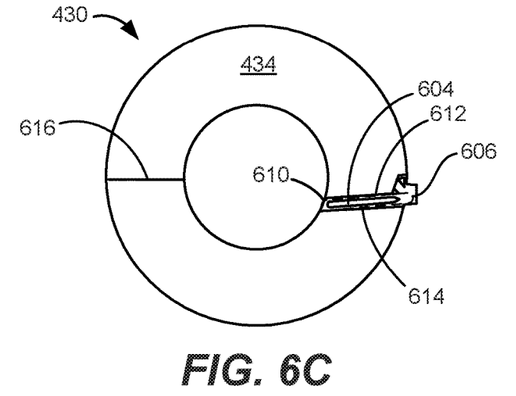

Referring now to FIGS. 6A-6C, which depict perspective (FIG. 6A) as well as top (FIG. 6B) and bottom (FIG. 6C) plan views of integrated coil and electromagnetic shield 430 according to some embodiments of the disclosure. As shown in FIGS. 6B and 6C, receiver coil 436 is positioned on a first side of the flex circuit while receiver shield 434 is positioned on the second, opposite side. Receiver shield 434 can have dimensions that correspond to the dimensions of receiver coil 436. In the embodiment depicted in FIGS. 6A-6C, receiver coil 436 and receiver shield 434 each have a flat donut or ring shape but in other embodiments the receiver shield can have a different shape that corresponds to the receiver coil, such as a square, rectangle, hexagon, triangle, and the like. Comparing FIG. 6C to FIG. 6B, one can see that electromagnetic receiver shield 434 is large enough to cover the entire receiver coil 436 so that receiver coil 436 is completely shielded by receiver shield 434.

A connection terminal 602 having one or more contact pads can be formed on the first side of the flex along with receiver coil 436. Connection terminal 602 can provide electrical routes through which current induced in receiver coil 436 can be routed to provide power to charge a battery in the electronic device within which the wireless power receiving module is incorporated. Additionally, connection terminal 602 can include one or more ground lines for routing voltage in receiver shield 436 to ground.

As shown in the figures, when laid out upon dielectric base layer 432, receiver coil 436 can have a flat, disc-like shape formed of a winding that spirals from an inner diameter to an outer diameter. Likewise, receiver shield 434 can also have a disk-like shape that has a corresponding inner and outer diameter. Receiver shield 434 can include a gap 610 formed between opposing ends 612, 614 of the receiver shield that are spaced apart from each other defining gap 610. Gap 610 can provide space for a connection segment 604 as discussed below. During operation, an electric field from receiver coil 436 can generate a voltage in receiver shield 434. The generated voltage may flow across receiver shield 434 to at least one of ends 612 and 614 and be discharged to ground.

As shown in FIG. 6C, the second side of the flex can also be used for a second layer of copper to wrap the inner turn of receiver coil 436 out to a termination in connection terminal 602 via a segment 604 and to ground the electromagnetic shield. The routing for segment 604 can be maintained in a very limited region 606 as shown in FIG. 6C. Thus, the second layer of copper is hidden in a very limited region and can be a different thickness (thinner) than the first layer that makes up coil 436 on the first side. Additionally, the additional thickness of the integrated coil and electromagnetic shield 430 in the limited area where segment 604 is formed can be accommodated for in the overall thickness of the wireless power receiving module by creating a cutout region in adhesive layer 450 corresponding to region 606 in which segment 604 is formed. Such a cutout region is shown, for example, in FIG. 3A as region 322 while an additional cutout region 312 can be formed in the ferrite shield to enable electrical connections to be made to the termination provide access to accommodate the contact pads 602 as shown in FIG. 3A as region 312.

In some embodiments, connection to ground can be established at end 612 of receiver shield 434 closest to the top of region 606 so that voltage generated on receiver shield 434 can be discharged to ground through segment 604. While providing a connection to ground at end 612 helps discharge voltage on receiver shield 434, performance of receiver shield 434 can be improved by including a cut 616 in receiver shield 434 positioned opposite of region 606 to electrically separate receiver shield 434 into two halves. An additional connection to ground can be provided at end 614 closest to the bottom of region 606 so that both halves of receiver shield 434 can be coupled to ground to discharge any voltage generated in receiver shield 434. Without cut 616 in receiver shield 434, the potential difference between ends 612 and 614 may be based on the voltage captured by the entire surface area of receiver shield 434. This can cause a large potential difference to build up between ends 612 and 614, and can be difficult to discharge to ground. By including cut 616, the potential difference can be substantially decreased, such as by a half, thereby making it easier to discharge the voltage to ground.

While not shown in the figures, in some embodiments, a NFC antenna coil or similar antenna coil can be formed between (intertwined with) the windings of receiver coil 436. For example, the gap between adjacent turns of the receiver coil can be made large enough to include a winding of an NFC antenna coil between adjacent receiver coil windings while maintaining an air gap between the edges of the NFC coil and the receiver coil.

With reference back to FIG. 6B, receiver coil 436 can be formed of a single length of wire that is wound into a plurality of turns. The wire can be wound about a center point and in increasing radii such that the resulting coil is substantially planar. As further shown in FIG. 6B, each turn is separated by a gap 438 that separates adjacent turns of receiver coil 436. Often times, the coil width-to-gap ratio in conventional receiver coils is selected to maximize the size of the receiver coil and to achieve the greatest wire width that the receiver can fit in its allotted space. According to some embodiments, however, the coil width-to-gap ratio is not selected to maximize the size of receiver coil 436 or to achieve the greatest wire width. Rather, the coil width-to-gap ratio can be tailored to maximize efficiency according to an operating frequency used during wireless power transfer. Higher operating frequencies tend to work better with coils having smaller wire widths. Thus, in some embodiments, the wire width-to-gap ratio can vary between 60:40 to 80:20, particularly 70:30 in some instances for an operating frequency of approximately 350 kHz. Furthermore, by not maximizing the wire width, the receiver coil may not have significantly more conductive material than a transmitter coil from which it is receiving power, which thereby may not significantly impact the operation of the transmitter coil during wireless power transfer.

In addition to coil width-to-gap ratio, an inner diameter 616 and an outer diameter 618 of receiver coil 436 can affect the charging characteristics of receiver coil 436 when it is placed against one or more transmitter coils. In some embodiments, inner diameter 616 is selected to correspond to the inner diameter of a transmitter coil from which receiver coil 436 receives wireless power. Outer diameter 618, on the other hand, can correspond to the outer diameter of the transmitter coil, or it can be greater than the outer diameter of the transmitter coil. When outer diameter 618 corresponds to the outer diameter of the transmitter coil, the charging efficiency between the two coils has a maximum efficiency when the two coils are aligned with each other, but may drastically decrease as the two coils become less aligned. This may be particularly beneficial in instances where alignment between the two coils is easily achieved or is intended to be achieved during wireless power transfer. By increasing outer diameter 618 however, the maximum efficiency may decrease but may result in less of a decrease in efficiency as the two coils become less aligned. This may be particularly useful in instances where perfect alignment between the two coils is less of a priority and that having a broader charging region is desired. In some embodiments, inner diameter 616 corresponds to an inner diameter of a transmitter coil from which it receives power, and outer diameter 618 is greater than the outer diameter of the transmitter coil.

As shown herein with respect to FIGS. 6A and 6B, the each turn of wire in receiver coil 436 has the same width as the other turns in receiver coil 436; however, embodiments are not limited to such configurations. Some embodiments can have turns in receiver coil 436 that have different widths. By varying the wire widths, receiver coil 700 can achieve a higher quality factor than coils that do not vary in wire widths. Furthermore, the varied wire widths allow for lower alternating current resistance (ACR) during wireless power transfer.

Figure 7:
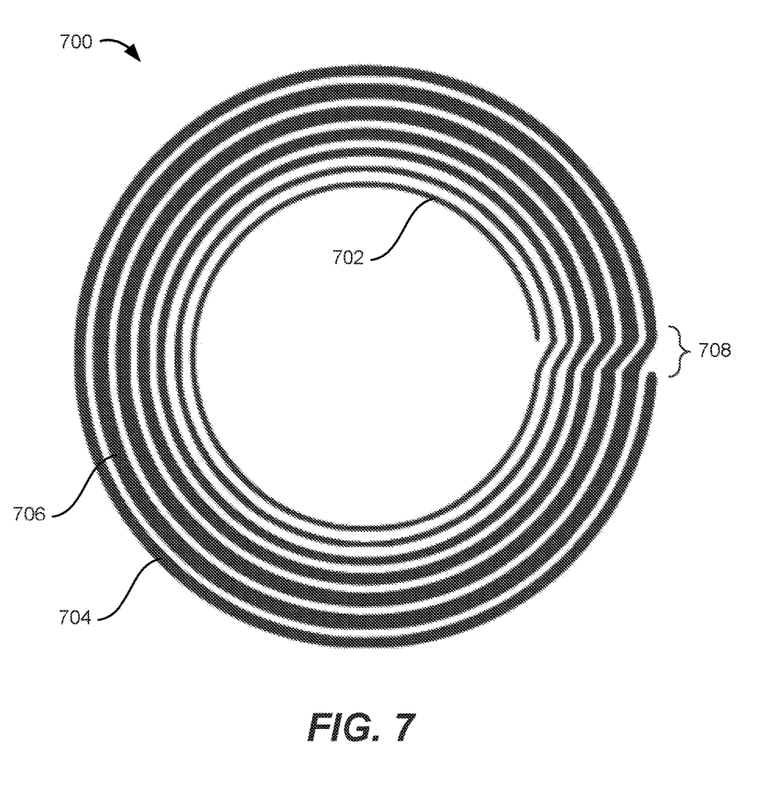
FIG. 7 illustrates a simplified top-down view of a receiver coil formed of a wire having turns that vary in widths according to some embodiments of the present disclosure.

FIG. 7 illustrates a simplified top-down view of a receiver coil 700 formed of a wire having turns that vary in widths, according to some embodiments of the present disclosure. Receiver coil 700 can wind from an inner turn 702 to an outer turn 704, thereby resulting in a plurality of turns that form receiver coil 700. In some embodiments, each turn of receiver coil 700 has a different thickness than other turns in receiver coil 700. For instance, the widths of the wire can progressively increase each turn from inner turn 702 to outer turn 704. However, outer turn 704 may not necessarily be have the largest width. In certain embodiments, a turn 706 adjacent to outer turn 704 can have the largest width, such that the wire width decreases from turn 706 to outer turn 704. Although FIG. 7 illustrates receiver coil 700 being configured with varying wire widths that first increases from inner turn 702 to turn 706 and then decreases from turn 706 to outer turn 704, embodiments are not limited to such configurations. Any arrangement of wire widths can be implemented to form receiver coil 700.

As can be appreciated from the illustration of FIG. 7, each turn of wire has a constant wire width. Meaning, the width of the wire along an entire turn does not decrease in width, e.g., does not taper to a narrower width or a wider width in a single turn. In some embodiments, a transition region 708 can be a region of receiver coil 700 where wire widths change to respective wire widths for each turn. Transition region 708 can be relatively small compared to the rest of the turn so that a vast majority of the turn has a constant wire width.

FIGS. 6A-6B and 7 illustrate receiver coils formed of a patterned conductive trace on a flexible circuit board. It is to be appreciated however that embodiments are not limited to receiver coils patterned on flexible circuit boards. In certain embodiments, receiver coils discussed herein can be formed of stranded wires.

Although the invention has been described with respect to specific embodiments, it will be appreciated that the invention is intended to cover all modifications and equivalents within the scope of the following claims. Additionally, spatially relative terms, such as "bottom," "top," "upward," or "downward" and the like may be used herein to describe an element and/or feature's relationship to another element(s) and/or feature(s) as, for example, illustrated in the accompanying figures. It will be understood, however, that the spatially relative terms are intended to encompass different orientations of the device in use and/or operation in addition to the orientation depicted in the figures. For example, if the device in the figures is turned over, elements described as a "bottom" surface may then be oriented "above" other elements or features. The device may be otherwise oriented (e.g., rotated 90 degrees or at other orientations) and the spatially relative descriptors used herein interpreted accordingly.

What is claimed is:

1. A wireless power receiving module to receive magnetic flux for wireless power transfer, the module comprising:
    a receiver coil comprising a single length of wire wound into a plurality of turns, the receiver coil configured to receive magnetic flux generated by a transmitter coil in a wireless charging device during a charging event and generate a plurality of electric fields;
    an electromagnetic receiver shield that is a passive component and coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil;
a ferrite layer coupled to a second side of the receiver coil opposite of the first side, the ferrite layer positioned to redirect magnetic flux during the charging event to improve charging efficiency; and
a thermal mitigation shield comprising a thermally conductive layer adhered to an electrically conductive layer where the electrically conductive layer is coupled to ground, enabling the electrically conductive layer to capture stray flux during the charging event, wherein the ferrite layer is sandwiched between the thermal mitigation shield and the receiver coil.

2. The wireless power receiving module of claim 1, wherein the electromagnetic receiver shield is grounded to discharge voltage generated by the plurality of electric fields.

3. The wireless power receiving module of claim 1, wherein the electromagnetic receiver shield comprises silver.

4. The wireless power receiving module of claim 1, wherein the receiver coil comprises copper wire having plated layers of nickel and immersion gold formed over the copper wire.

5. The wireless power receiving module of claim 1, wherein the thermally conductive layer comprises graphite and the electrically conductive layer comprises copper.

6. The wireless power receiving module of claim 1, further comprising a flex circuit formed of a flexible dielectric layer having first and second opposing sides, wherein the receiver coil is disposed on the first side and the electromagnetic receiver shield is disposed on the second side.

7. The wireless power receiving module of claim 1, wherein the receiver coil is directly attached to the ferrite layer.

8. The wireless power receiving module of claim 1, wherein the receiver coil has a trace width-to-gap ratio of 70 to 30.

9. The wireless power receiving module of claim 1, wherein each turn of the plurality of turns have a wire width that is different than other turns of the plurality of turns.

10. An electronic device configured to receive magnetic flux for wireless power transfer, the electronic device comprising:
a housing having a charging surface;
a battery positioned within the housing;
a wireless power receiving module positioned within the housing adjacent to the charging surface to receive magnetic flux for wireless power transfer during a charging event, the wireless power receiving module comprising:
a receiver coil comprising a single length of wire wound into a plurality of turns, the receiver coil configured to receive magnetic flux generated by a transmitter coil in a wireless charging device during a charging event and generate a plurality of electric fields;
an electromagnetic receiver shield that is a passive component and coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil;
a ferrite layer coupled to a second side of the receiver coil opposite of the first side, the ferrite layer positioned to redirect magnetic flux during the charging event to improve charging efficiency; and
a thermal mitigation shield comprising a thermally conductive layer adhered to an electrically conductive layer where the electrically conductive layer is coupled to ground, enabling the electrically conductive layer to capture stray flux during the charging event, wherein the ferrite layer is sandwiched between the thermal mitigation shield and the receiver coil.

11. The electronic device of claim 10, wherein the electromagnetic receiver shield is grounded to discharge voltage generated by the plurality of electric fields.

12. The electronic device of claim 10, wherein the electromagnetic receiver shield comprises silver.

13. The electronic device of claim 10, wherein the receiver coil comprises copper wire having plated layers of nickel and immersion gold formed over the copper wire.

14. The electronic device of claim 10, wherein the thermally conductive layer comprises graphite and the electrically conductive layer comprises copper.

15. A wireless charging system comprising:
a wireless charging device including a transmitter coil configured to generate a magnetic flux across a charging surface and a transmitter shield positioned between the charging surface and the transmitter coil, the transmitter shield made from material that enables the transmitter shield to intercept some electric fields generated during a charging event and directed away from the transmitter coil and allow the magnetic flux to pass through the transmitter shield;
an electronic device configured to receive the magnetic flux generated by the wireless charging device during a charging event, the electronic device comprising: a housing having a charging surface; a battery positioned within the housing; and a wireless power receiving module positioned within the housing adjacent to the charging surface to receive magnetic flux for wireless power transfer during a charging event, the wireless power receiving module comprising:
a receiver coil comprising a single length of wire wound into a plurality of turns, the receiver coil configured to receive magnetic flux generated by a transmitter coil in a wireless charging device during a charging event and generate a plurality of electric fields;
an electromagnetic receiver shield that is a passive component and coupled to a first side of the receiver coil, the electromagnetic receiver shield being configured to intercept some of the plurality of electric fields directed away from the receiver coil and allow the magnetic flux to pass through the first electromagnetic receiver shield toward the receiver coil;
a ferrite layer coupled to a second side of the receiver coil opposite of the first side, the ferrite layer positioned to redirect magnetic flux during the charging event to improve charging efficiency; and
a thermal mitigation shield comprising a thermally conductive layer adhered to an electrically conductive layer where the electrically conductive layer is coupled to ground, enabling the electrically conductive layer to capture stray flux during the charging event, wherein the ferrite layer is sandwiched between the thermal mitigation shield and the receiver coil.

16. The wireless charging system of claim 15, wherein the electromagnetic receiver shield is grounded to discharge voltage generated by the plurality of electric fields.

17. The wireless charging system of claim 15, wherein the electromagnetic receiver shield comprises silver.

18. The wireless charging system of claim 15, wherein the receiver coil comprises copper wire having plated layers of nickel and immersion gold formed over the copper wire.

19. The wireless charging system of claim 15, wherein the thermally conductive layer comprises graphite and the electrically conductive layer comprises copper.

20. The wireless charging system of claim 15, further comprising a flex circuit formed of a flexible dielectric layer having first and second opposing sides, wherein the receiver coil is disposed on the first side and the electromagnetic receiver shield is disposed on the second side.

* * * * *